US008327375B2

(12) United States Patent
Somogyi

(10) Patent No.: US 8,327,375 B2
(45) Date of Patent: *Dec. 4, 2012

(54) SYSTEM AND METHOD FOR SUPPORTING RESOURCE ENLISTMENT SYNCHRONIZATION

(75) Inventor: Alexander J. Somogyi, Bernardsville, NJ (US)

(73) Assignee: Oracle International Corporation, Redwood Shores, CA (US)

(*) Notice: Subject to any disclaimer, the term of this patent is extended or adjusted under 35 U.S.C. 154(b) by 48 days.

This patent is subject to a terminal disclaimer.

(21) Appl. No.: 12/961,282

(22) Filed: Dec. 6, 2010

(65) Prior Publication Data

US 2011/0078687 A1 Mar. 31, 2011

Related U.S. Application Data

(63) Continuation of application No. 10/788,802, filed on Feb. 27, 2004, now Pat. No. 7,849,464.

(60) Provisional application No. 60/451,334, filed on Feb. 28, 2003.

(51) Int. Cl.
*G06F 9/46* (2006.01)
*G06F 12/00* (2006.01)

(52) U.S. Cl. ......... 718/104; 718/107; 707/813

(58) Field of Classification Search ............ None
See application file for complete search history.

(56) References Cited

U.S. PATENT DOCUMENTS

| | | | |
|---|---|---|---|
| 5,095,421 A | | 3/1992 | Freund |
| 5,465,363 A | * | 11/1995 | Orton et al. ............ 718/107 |
| 6,052,731 A | | 4/2000 | Holdsworth |
| 6,105,057 A | * | 8/2000 | Kuftedjian et al. ........... 709/213 |
| 6,157,927 A | | 12/2000 | Schaefer |
| 6,272,675 B1 | | 8/2001 | Schrab |
| 6,275,863 B1 | | 8/2001 | Leff |
| 6,360,243 B1 | | 3/2002 | Lindsley et al. |
| 6,411,985 B1 | | 6/2002 | Fujita et al. |
| 6,470,342 B1 | | 10/2002 | Gondi |
| 6,754,696 B1 | | 6/2004 | Kamath et al. |
| 6,856,993 B1 | | 2/2005 | Verma et al. |
| 6,865,549 B1 | * | 3/2005 | Connor ........................ 705/51 |
| 6,883,172 B1 | * | 4/2005 | Angeline et al. ............. 719/315 |
| 7,076,784 B1 | | 7/2006 | Russell et al. |
| 7,206,805 B1 | * | 4/2007 | McLaughlin, Jr. ........... 709/203 |
| 2001/0049726 A1 | | 12/2001 | Comeau et al. |

(Continued)

OTHER PUBLICATIONS

Wills, C. E. et al., "Resource-Driven Resource Location," IEEE, Jan. 1993, vol. 2, pp. 80-89.

(Continued)

*Primary Examiner* — Camquy Truong
(74) *Attorney, Agent, or Firm* — Fliesler Meyer LLP

(57) ABSTRACT

A system uses a transaction manager for supporting resource enlistment synchronization on an application server with a plurality of threads. This system also includes a plurality of wrapper objects, each of which wrapper object wraps a resource object associated with the application server. Upon receiving a request from a thread to enlist a resource object in a transaction, the transaction manager first checks with a wrapper object that wraps the resource object to see if there is a lock being held on the resource object by another said thread in another said transaction. If there is a lock, the transaction manager allows the thread to wait and signal the thread once the lock is freed by another said thread in another said transaction. Otherwise, the transaction manager grants a lock to the thread and holds the lock until an owner of the thread delists the resource object.

14 Claims, 4 Drawing Sheets

U.S. PATENT DOCUMENTS

| | | | |
|---|---|---|---|
| 2002/0087366 | A1 | 7/2002 | Collier |
| 2002/0194244 | A1 | 12/2002 | Raventos |
| 2004/0093602 | A1* | 5/2004 | Huston et al. ............ 718/107 |
| 2004/0153349 | A1 | 8/2004 | K. et al. |
| 2004/0215773 | A1 | 10/2004 | Strait |
| 2005/0015425 | A1 | 1/2005 | Kumar |
| 2005/0120036 | A1 | 6/2005 | Verma |

OTHER PUBLICATIONS

Saewong, S. et al., "Cooperative Scheduling of Multiple Resources," IEEE, 1999, pp. 90-101.

Allamaraju, S., "Nuts and Bolts of Transaction Processing," subbu.org/articles/transactions/NutsAndBoltsOfTP.html, Jan. 18, 2007, pp. 1-33.

Muth, P. et al., "How to Handle Global Transactions in Heterogeneous Database Systems," Research Issues on Data Engineering, 1992: Second International Workshop on Transaction and Query Processing, IEEE, Feb. 1992, pp. 192-198.

Zhang, A. et al., "On Structural Features of Global Transactions in Multidatabase Systems," Research Issues in Data Engineering, 1993: Third International Workshop on Interoperability in Multidatabase Systems, Apr. 19-20, 1993, Proceedings RIDE-IMS '93, IEEE, pp. 199-206.

Zhang, A. et al., "Global Scheduling for Flexible Transactions in Heterogeneous Distributed Database Systems," IEEE Transactions on Knowledge and Data Engineering, vol. 13, No. 3, May/Jun. 2001, pp. 439-450.

* cited by examiner

Fig. 2 - Prior Art

SYSTEM AND METHOD FOR SUPPORTING RESOURCE ENLISTMENT SYNCHRONIZATION

CLAIM TO PRIORITY

This application is a continuation of U.S. patent application Ser. No. 10/788,802 entitled "PROTECTION AGAINST INTERLEAVING TRANSACTIONS USING A TRANSACTION MANAGER" filed Feb. 27, 2004, now U.S. Pat. No. 7,849,464, which claims the benefit of priority under 35 U.S.C. §119(e) to U.S. Provisional Patent Application entitled "TRANSACTION MANAGER FOR PROTECTION AGAINST INTERLEAVING TRANSACTIONS" Ser. No. 60/451,334, filed on Feb. 28, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to global transaction management in application servers, and more particularly to global transaction management between multiple applications in application server systems.

BACKGROUND OF THE INVENTION

Transaction managers in enterprise systems may be used to monitor and manage transactions between resources and applications in application server systems. In particular, the transaction manager monitors global transactions and provides servers and resources within an application server system with status and availability information regarding other servers and resources.

The transaction manager may be provided by the application sever provided. One such provider of application servers is BEA Systems, of San Jose, Calif., who provide the Web Logic Server application server system. The WebLogic Server (WLS) Transaction Manager (TM) implements the J2EE JTA specification. This specification is based on the OpenGroup Distributed Transaction Processing Model (DTPM). A typical J2EE distributed transaction processing model 100 is depicted in FIG. 1. Distributed Transaction Processing Model 100 includes application (App) 110, resource manager (RM) 120, and transaction manager (TM) 130. The TM coordinates two-phase commit (2PC) transactions that involve multiple resources. Resources developed by third parties may be utilized in WLS applications because they adhere to the J2EE standards. The App communicates with the RM using an API such as JDBC (for relational databases) and JMS (for queuing systems). The App controls transaction demarcation using the JTA API. The TM communicates with the RM during 2PC processing using the XA interface, specifically the XAResource interface as defined in the J2EE JTA specification. This interface provides methods for enlisting and delisting a resource in a global transaction, preparing the resource (first phase of 2PC), and committing or rolling back the resource (second phase of 2PC). There are also methods for use in failure recovery (recover), resource comparison (is SameRM) and error processing (forget).

Application components access an RM using the various APIs. These APIs typically utilize a logical connection to the resource. A logical resource connection is often associated with a XAResource instance. Enlistment of a resource in a global transaction entails having the TM associate the unique transaction identifier (Xid) with work that is performed in the resource, and is performed by invoking the XAResource.start( )method on the resource. Subsequent application updates to the resource will be associated with the global transaction. Resource delistment entails having the TM invoke XAResource.end on the resource, which disassociates future application updates on the resource over the logical connection from the previously enlisted Xid.

FIG. 2 illustrates a typical resource enlistment process 200. In process 200, the App 110 first begins a global transaction at step 210. The App then accesses the resource and invokes an update operation on the resource at step 220 using an API specific to the resource. For instance, the App may perform a JDBC update operation. When the update operation is invoked on the resource, the resource first makes a call into the TM at step 230 using the Transaction.enlistResource method. The resource passes the TM the XAResource object that the TM needs to utilize in order to perform the transaction enlistment and 2PC processing when the transaction is later committed or rolled back. In response to the enlistResource call, the TM will invoke XAResource.start on the resource at step 240. The application update is then performed in the resource at step 250 and is associated with the transaction that was specified during the enlistment start method. After the application request has been processed, the resource may invoke the delistResource method on the TM at step 260 to disassociate future operations from the transaction. The TM responds by calling XAResource.end on the resource at step 270. The process 200 of resource enlistment is then complete.

While a first application has a logical connection with a resource, a second application may attempt to establish a logical connection with the same resource or attempt a concurrent update to the resource. In such a case, the second connection attempt would fail and result in an exception because to have different transactions simultaneously enlisted with a single logical connection is an XA protocol violation.

What is needed is a transaction manager that can manage multiple transaction requests from a resource object, thereby improving the efficiency of global transaction processing.

SUMMARY OF THE INVENTION

In one embodiment of the present invention, a system uses a transaction manager for supporting resource enlistment synchronization on an application server with a plurality of threads. This system also includes a plurality of wrapper objects, each of which wrapper object wraps a resource object associated with the application server. Upon receiving a request from a thread to enlist a resource object in a transaction, the transaction manager first checks with a wrapper object that wraps the resource object to see if there is a lock being held on the resource object by another said thread in another said transaction. If there is a lock, the transaction manager allows the thread to wait and signal the thread once the lock is freed by another said thread in another said transaction. Otherwise, the transaction manager grants a lock to the thread and holds the lock until an owner of the thread delists the resource object.

DETAILED DESCRIPTION

In one embodiment of the present invention, a transaction manager maintains an enlistment data structure used for managing resource object enlistment. A transaction manager may receive an enlistment request initiated from a resource object. Upon receiving the request, the transaction manager will determine if the resource object is already enlisted. If the resource object is already enlisted, the transaction manager will block the enlistment request. If the resource object is not enlisted, the transaction manger will enlist the resource. Upon enlistment, the resource object will perform a requested task or service and the resource is considered locked. After the requested task or service is complete, the resource initiates a delistment request to the transaction manager. After receiving the delistment request from the resource object, the transaction manager is delisted from the enlistment data structure.

Figure 1:
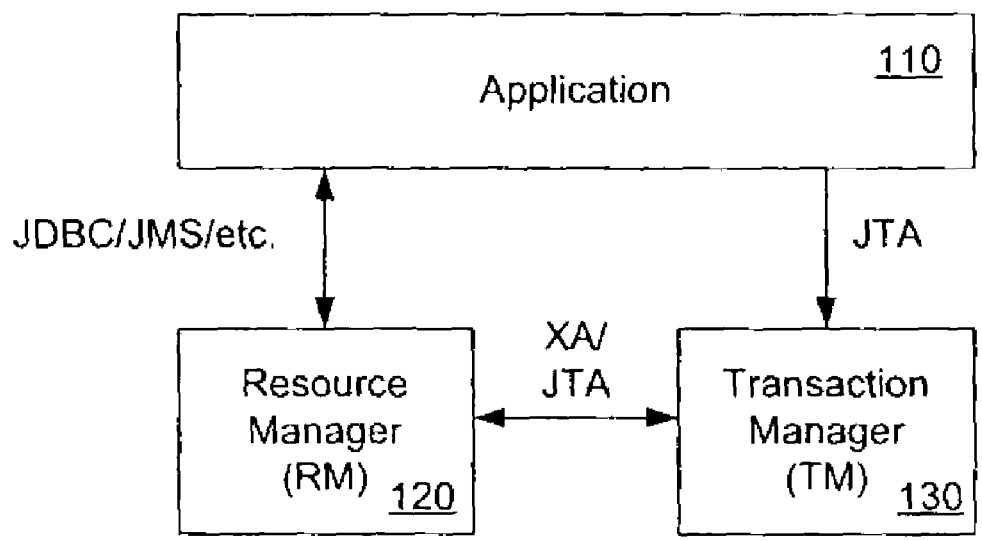
FIG. 1 is an illustration of a J2EE Distributed Transaction Processing Model in accordance with the prior art.
Figure 2:
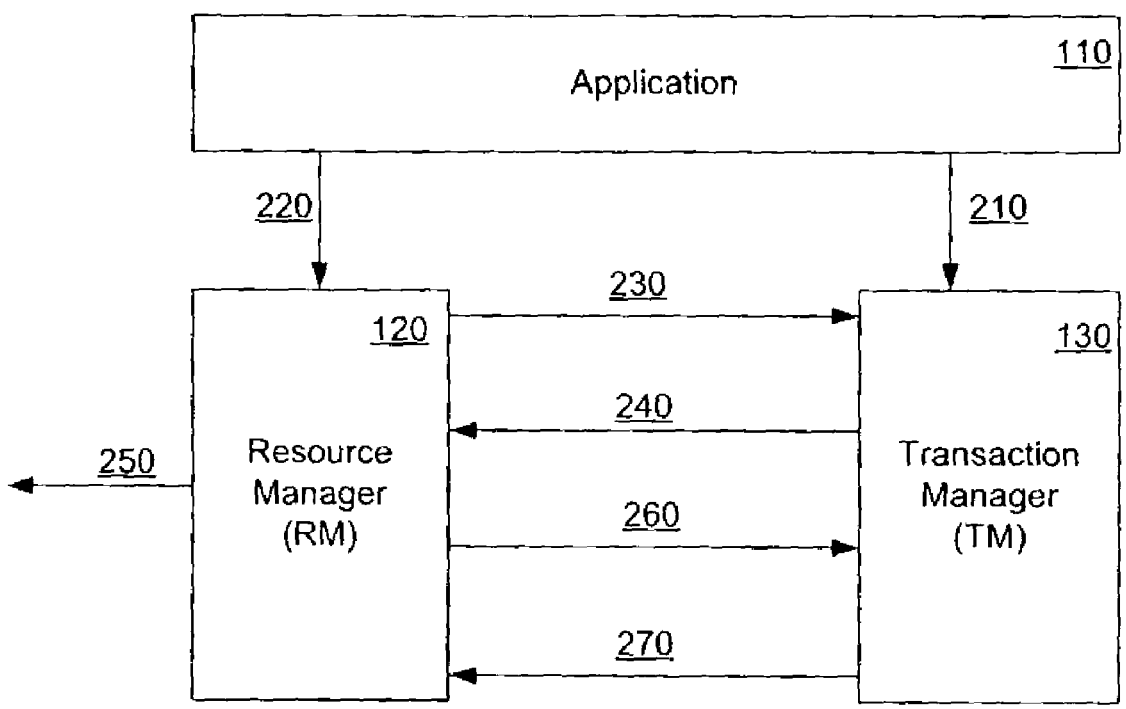
FIG. 2 is an illustration of a method for implementing resource enlistment in accordance with the prior art.
Figure 3:
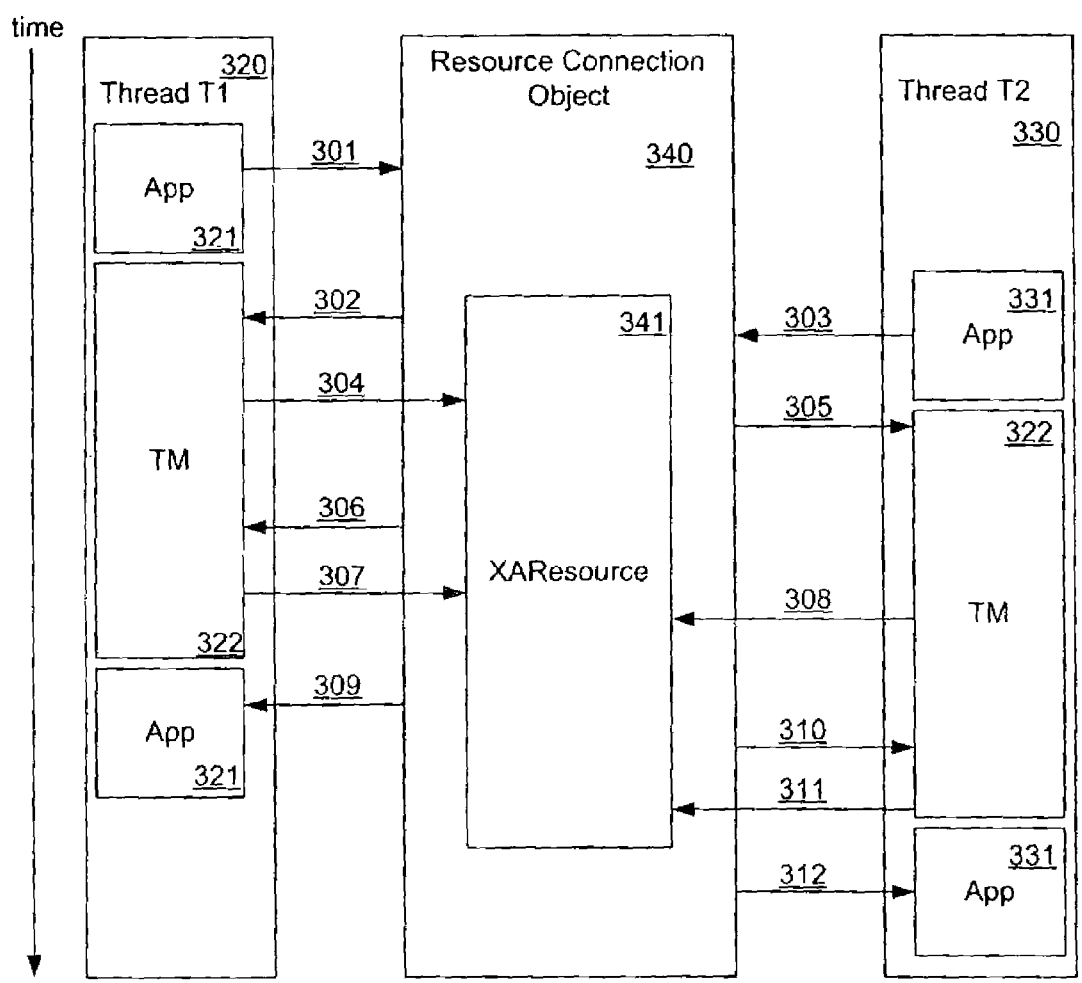
FIG. 3 is an illustration of a method for implementing interleaving resource enlistment in accordance with one embodiment of the present invention.

FIG. 3 illustrates a system 300 for implementing interleaving resource enlistment in accordance with one embodiment of the present invention. System 300 includes thread T1 320, App 321, TM 322, thread T2 330, App 331, resource connection object 340, and XAResource 341. In one embodiment, system 300 may be implemented on an application server system. The application server system may be on a single machine or several machines. Apps 321 and 331 may request a service from a resource during a connection involving different types of APIs. The system and methods of the present invention may be implemented using the different types of APIs and their related connection formats, including connections for JDBC and sessions for JMS.

Elements 301 through 312 represent communications that comprise the interleaving enlistment process. First in the process, App 321 makes a call to update a resource at 301. The call is received by resource connection object 340. The request may include a call to a method in the resource object, and may include the passing of parameters to the resource object. Next, the resource connection object 340 places a call to the TM at 302. In one embodiment, the call from the resource to the transaction manager may be over an XA protocol interface. The call may include resource object information and may be to a method that enlists resources, such as enlistResource, thus informing the transaction manager that current work performed by the resource is to be associated with the current transaction. After receiving the call, the transaction manager enlists the resource in the transaction. Next, the TM will then signal at 304 to the resource to begin processing the call to the resource.

At some point in the operation of system 300, an App 331 may make a call 303 to the resource connection object 340. In another embodiment, an App may make a call to the resource connection object 340 at some point before or after the call 303 by App 331 as illustrated in FIG. 3. The TM of the interleaving enlistment system 300 will handle the call by the subsequent App call in serial as long as App 321 is already enlisted.

At 305, the resource connection object places another call to the TM at 302. The enlistment request by thread T2 330 is blocked until the in-progress enlistment of thread T1 completes. The blocked enlistment of thread T2 prevents different transactions enlisted with a logical connection to the same resource at the same time.

Once the resource receives a start signal from the TM at 304, the resource 341 performs the task requested by App 321 in thread T1 320. In one embodiment, the task involves performing operations of a resource object method called by the application. After a result is obtained for the requested task, the resource object initiates delistment. In one embodiment, the resource object calls a delist resource method in the transaction manager at 306. Calling the delist resource method on the TM delists the resource from the current transaction. In one embodiment, the call to delist the resource includes the transaction ID (XID) as a parameter. In response to the delist resource method call to the TM, the TM makes a call 307 to the resource to end the logical connection associated with the current transaction. In one embodiment, the TM calls a XA resource end method on the resource object and provides the XID as a parameter. After receiving an end call 307 from the TM, the resource object may perform a self update such that resource object actions are no longer associated with the XID. Additionally, the resource may provide a result to the application at 309 that requested the resource services. In another embodiment, the result may be provided before, after, or during the resource delistment depending upon the particular resource design and implementation of the transaction manager, resource object, and client application.

After the TM places a call 307 to the XAResource ending the resource's association with the current transaction, the TM makes another call to the XAResource at 308 to initiate the resource to perform work associated with the second thread 330 and corresponding transaction ID. The XAResource then performs work associated with the second thread 330, and delists the resource with the transaction ID in a call 310 to the TM. The TM responds to the delist call 310 by calling the XAResource to indicate that the resource should stop associating work performed with the transaction ID provided at step 308. The XAResource may then provide results at 312 to the application 331 as discussed above with respect to App 321 in step 309.

Figure 4:
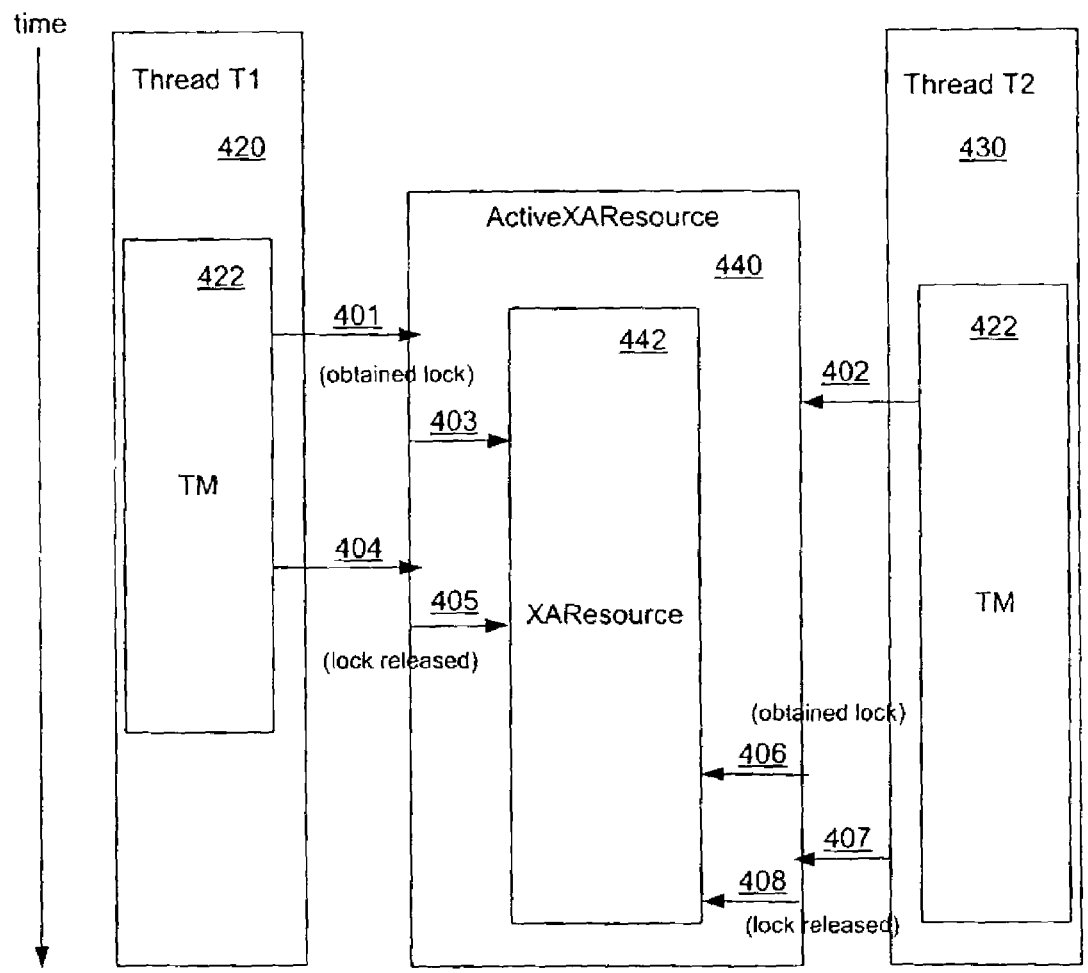
FIG. 4 is an illustration of interleaving resource enlistment synchronization in accordance with one embodiment of the present invention.

An illustration of the interleaving resource enlistment synchronization system 400 is illustrated in FIG. 4. The synchronization system 400 includes thread T1 420, TM 422, thread T2 430, activeXAResource 440, and XAResource 442. In one embodiment, each XAResource instance in a server node (only one illustrated in FIG. 4) is wrapped in an object that the TM will use to synchronize concurrent enlistment requests. The TM maintains a collection of these wrapper objects which are checked for each resource enlistment. In one embodiment, for each request to enlist the resource, the TM will first check to see if there is a lock being held on the resource by another thread of control. If not, the lock is granted to the accessor and held until the owner Xid delists the resource. The waiting threads, if any, will be signaled once the lock is free. Once free, one of the waiting threads will be granted the lock and will be allowed to proceed with its enlistment. In one embodiment, the waiting thread that requested the resource first will be granted the lock. In another embodiment, some other priority method may be used to determine which thread will be granted the lock, such as threads handling a specific type of application. The collection of wrapped XAResource objects may be periodically processed to remove objects that are no unused or no longer active. In one embodiment, the wrapped XAResource objects is periodically garbage collected to clear state and unused entries.

The synchronization process of system 400 is illustrated by steps 401 through 408. In step 401, the TM 422 of the first thread 420 enlists the XAResource 440. The enlistment request is received by ActiveXAResource wrapper 440. By enlisting the XAResource via the wrapper, thread 420 obtains a lock on the XAResource. The ActiveXAResource wrapper than initiates the start of work by the XAResource 442 at step 403. Once the XAResource has completed the work performed for thread 420, the TM delists the XAResource. The delist call 404 is received by ActiveXAResource wrapper 440. The wrapper 440 than sends an end call to XAResource 405, thus ending work performed by the XAResource from being associated with thread 420 and releasing the lock on the XAResource.

The synchronization of the second thread 430 tasks with the tasks of first thread 420 is illustrated in FIG. 4. Once the TM 422 enlists the XAResource and obtains the lock to the resource at step 401, any attempted enlist from the second thread 430 is blocked. Thus, the enlist attempt at step 402 from thread 430 is blocked as it occurs later in time than the enlist step 401 of thread 420. In one embodiment, the lock may be implemented using Java monitor or some similar method. The lock is held until the thread has completed performing operations on the resource. After the lock on XAResource 442 is released at step 405, the second thread 430 may obtain the lock at step 406. At this point, the XAResource may begin performing work for the second thread. After the resource is delisted from the transaction ID at step 407, the XAResource work for the second thread ends at step 408 and the lock on the XAResource is released.

In one embodiment, the transaction manager may maintain an enlistment data structure (EDS) to help manage resource enlistments. The EDS maintains a mapping of resources and transaction identification information currently in use, including XA resource objects. When a resource calls the transaction manager to be enlisted, the transaction manager searches the EDS to determine if the resource is already listed. If the resource is not listed in the EDS, the transaction manager lists the resource in the EDS. In some cases, a thread associated with an application may call a method on a resource already enlisted in the EDS. In this case, the transaction manager will block the enlistment of the resource. The resource then waits until the enlistment of the resource win the EDS is removed.

The transaction manager contains identification information regarding the resource within the EDS at least until the transaction manager receives a signal indicating the resource has generated a result or otherwise completed the service invoked by the initiating application. In one embodiment, enlistments of resources are removed at predetermined time intervals. At each time interval, each enlistment is checked to determine if it has not been accessed for at certain period of time. If an enlistment has not been accessed for the certain period of time, it is delisted from the EDS automatically. In another embodiment, the delistment occurs as soon as the resource has been idle (not accessed) for the certain period of time. In this case, the transaction manager does not wait for the time interval to expire before determining if any resource objects have not been accessed. These methods of delistment reduce the number of add an remove operations associated with the EDS and make the transaction monitor more efficient. The idle period and time check interval may be chosen based on the design and operation of the specific application server system as will be understood by those skilled in the art of application server programming.

In one embodiment of the present invention, a transaction manager maintains an enlistment data structure used for managing resource object enlistment. A transaction manager may receive an enlistment request initiated from a resource object. Upon receiving the request, the transaction manager will determine if the resource object is already enlisted. If the resource object is already enlisted, the transaction manager will block the enlistment request. If the resource object is not enlisted, the transaction manger will enlist the resource. Upon enlistment, the resource object will perform a requested task or service and the resource is considered locked. After the requested task or service is complete, the resource initiates a delistment request to the transaction manager. After receiving the delistment request from the resource object, the transaction manager is delisted from the enlistment data structure.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, maintaining an enlistment data structure, managing thread execution calls, and implementing a transaction manager that protects against interleaving transactions.

The invention claimed is:

1. A system for supporting resource enlistment synchronization, comprising:
    one or more micro-processors;
    an application server with a plurality of threads, running on the one or more micro-processors;
    a transaction manager that manages a plurality of transactions, wherein each transaction is associated with at least one said thread, and the transaction manager operates to be associated with each of the plurality of threads;
    a plurality of wrapper objects, wherein each wrapper object wraps a resource object of a plurality of resource objects, wherein the transaction manager maintains and communicates with each wrapper object of the plurality of wrapper objects to manage resource object enlistment requests from different said threads associated with different transactions;
    wherein the transaction manager maintains an enlistment data structure to manage resource object enlistment for the plurality of transactions, and wherein the enlistment data structure maintains a mapping between the plurality of resource objects and the plurality of transactions;
    wherein when the wrapper object receives a delist call from the transaction manager, the wrapper object sends an end call to the resource object to end work performed by the resource object associated with the thread and release the lock on the resource object; and
    wherein, upon receiving a request from a thread of the plurality of threads to enlist a resource object of the plurality of resource objects in a transaction, the transaction manager
        first checks with a wrapper object that wraps the resource object to see if there is a lock being held on the resource object by another said thread in another said transaction,
        if there is a lock, then allows the thread to wait and signal the thread once the lock is freed by the another said thread in the another said transaction,
        if there is no lock, then grants a lock to the thread and holds the lock until an owner of the thread delists the resource object, wherein the wrapper object is used to access the resource object for the thread.

2. The system of claim 1, wherein:
the plurality of wrapper objects are periodically processed to remove objects that are unused or no longer active.

3. The system of claim 1, wherein:
each of the plurality of resource objects resides in a server node.

4. The system of claim 1, wherein:
the transaction manager uses a priority method to determine which thread will be granted a lock.

5. The system of claim 1, wherein:
after the thread obtains a lock, the thread uses the wrapper object to initiate work on the resource object.

6. The system of claim 1, wherein:
once the transaction manager enlists the resource object and obtains a lock to the resource object, any attempted enlist from a second thread is blocked.

7. The system of claim 1, wherein:
the wrapper object is periodically garbage collected to clear state and unused locks.

8. A method for supporting resource enlistment synchronization, comprising:
    providing an application server with a plurality of threads, running on one or more micro-processors;
    managing, via a transaction manager, a plurality of transactions, wherein each transaction is associated with at least one said thread, and the transaction manager operates to be associated with each of the plurality of threads;
    wrapping each resource object of a plurality of resource objects with a wrapper object in a plurality of wrapper objects, wherein the transaction manager maintains and communicates with each wrapper object of the plurality of wrapper objects to manage resource object enlistment requests from different said threads associated with different transactions;
    maintaining, via the transaction manager, an enlistment data structure to manage resource object enlistment for the plurality of transactions, and wherein the enlistment data structure maintains a mapping between the plurality of resource objects and the plurality of transactions;
    sending, via the wrapper object when the wrapper object receives a delist call from the transaction manager, an end call to the resource object to end work performed by the resource object associated with the thread and release the lock on the resource object;
    receiving a request from a thread of the plurality of threads to enlist a resource object of the plurality of resource objects in a transaction at the transaction manager;
        first checking with a wrapper object of the resource object, via the transaction manager, to see if there is a lock being held on the resource object by another said thread in another said transaction;
        if yes, allowing, via the transaction manager, the thread to wait and signaling the thread once the lock is freed by the another said thread in the another said transaction; and
        if not, granting, via the transaction manager, a lock to the thread and holding the lock until an owner of the thread delists the resource object, wherein the wrapper object is used to access the resource object for the thread.

9. The method of claim 8, further comprising:
allowing the plurality of wrapper objects to be periodically processed in order to remove objects that are unused or no longer active.

10. The method of claim 8, further comprising:
using a priority method to determine which thread will be granted a lock.

11. The method of claim 8, further comprising:
after obtaining a lock, using, via the thread, the wrapper object to initiate work on the resource object.

12. The method of claim 8, further comprising:
once the transaction manager enlists the resource object and obtains a lock to the resource object, blocking any attempted enlist from a second thread.

13. The method of claim 8, further comprising:
determining, via the transaction manager, whether an application associated with the thread is a specific type of application;
granting, via the transaction manager, the thread a lock only when the application is determined to be the specific type of application.

14. A non-transitory computer-readable storage medium, storing instructions for supporting resource enlistment synchronization, the instructions comprising the steps of:
- providing an application server with a plurality of threads, running on one or more micro-processors;
- managing, via a transaction manager, a plurality of transactions, wherein each transaction is associated with at least one said thread, and the transaction manager operates to be associated with each of the plurality of threads;
- wrapping each resource object of a plurality of resource objects with a wrapper object in a plurality of wrapper objects, wherein the transaction manager maintains and communicates with each wrapper object of the plurality of wrapper objects to manage resource object enlistment requests from different said threads associated with different transactions;
- maintaining, via the transaction manager, an enlistment data structure to manage resource object enlistment for the plurality of transactions, and wherein the enlistment data structure maintains a mapping between the plurality of resource objects and the plurality of transactions;
- sending, via the wrapper object when the wrapper object receives a delist call from the transaction manager, an end call to the resource object to end work performed by the resource object associated with the thread and release the lock on the resource object;
- receiving a request from a thread of the plurality of threads to enlist a resource object of the plurality of resource objects in a transaction at the transaction manager;
    - first checking with a wrapper object of the resource object, via the transaction manager, to see if there is a lock being held on the resource object by another said thread in another said transaction;
    - if yes, allowing, via the transaction manager, the thread to wait and signaling the thread once the lock is freed by the another said thread in the another said transaction;
    - if not, granting, via the transaction manager, a lock to the thread and holding the lock until an owner of the thread delists the resource object, wherein the wrapper object is used to access the resource object for the thread.

* * * * *

UNITED STATES PATENT AND TRADEMARK OFFICE
CERTIFICATE OF CORRECTION

PATENT NO. : 8,327,375 B2
APPLICATION NO. : 12/961282
DATED : December 4, 2012
INVENTOR(S) : Somogyi It is certified that error appears in the above-identified patent and that said Letters Patent is hereby corrected as shown below:

In column 2, line 2, delete "(is SameRM)" and insert -- (isSameRM) --, therefor.

In column 2, line 9-10, delete "XAResource.start( )method" and insert
-- XAResource.start( ) method --, therefor.

Signed and Sealed this
Twelfth Day of March, 2013

Teresa Stanek Rea
*Acting Director of the United States Patent and Trademark Office*